Feb. 13, 1940.     T. CURZON     2,190,402
ELECTRICAL CONTROL SYSTEM
Filed Nov. 22, 1938     2 Sheets-Sheet 1

Inventor,
Thomas Curzon
By, Sommers & Young
Att'ys

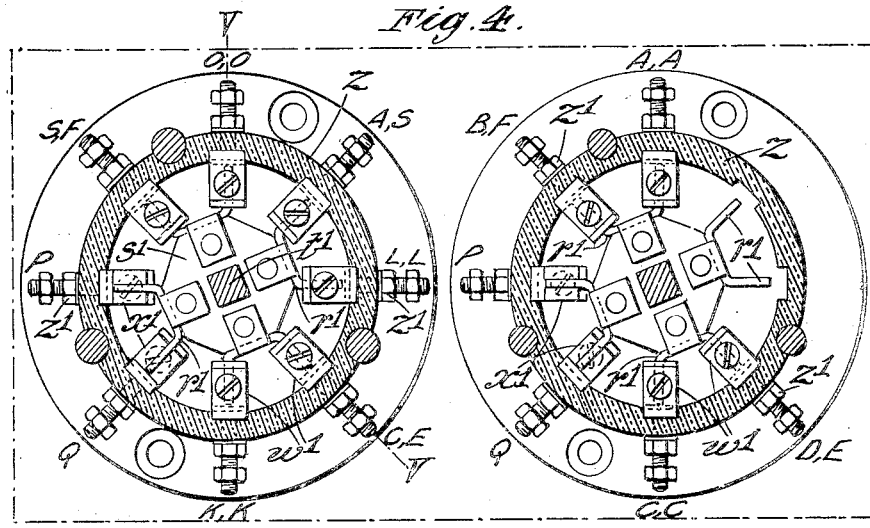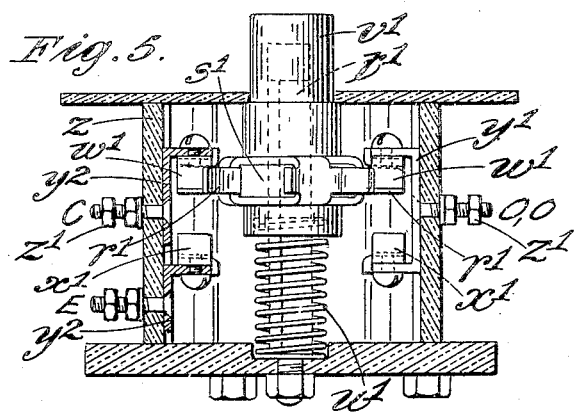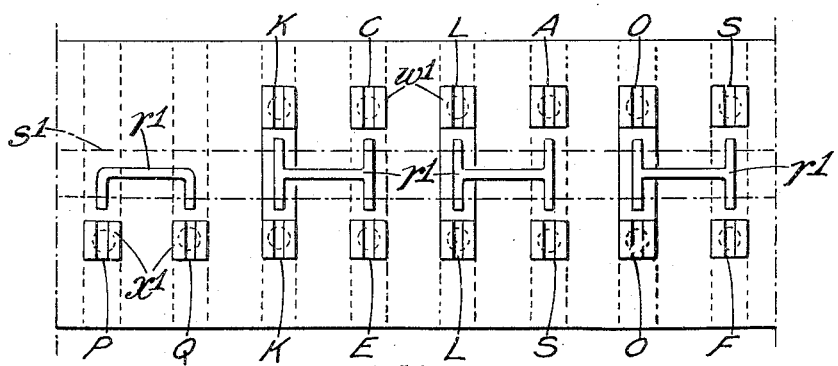

Patented Feb. 13, 1940

2,190,402

UNITED STATES PATENT OFFICE 2,190,402

ELECTRICAL CONTROL SYSTEM

Thomas Curzon, London, England, assignor to J. Stone & Company, Limited, Deptford, England, a company of Great Britain Application November 22, 1938, Serial No. 241,865
In Great Britain January 6, 1938

10 Claims. (Cl. 172—179)

This invention concerns improvements relating to electrical control systems, particularly systems for controlling the operation of motor-driven blinds, screens or the like provided on or in the windows of air-conditioned railway vehicles, for example as described in the application Serial Number 209,825. As will be understood, however, the control system in accordance with the invention may be applied to the operation of windows and to other analogous purposes in which a number of devices have to be capable of being operated, individually under local control and in unison under remote control, between end positions, for instance closed and open positions.

According to the present invention, an electrical control system comprises in combination with a series of motors, a master switch-device and a series of local switch-devices, the master device comprising two switches which in their normal positions prepare circuits capable of being completed in any local device for driving the individual motor in either direction and which in their respective actuated positions complete respective circuits for driving all the motors in either direction, and each local device comprising two switches which in their normal positions prepare local circuits to be completed in the master device and which in their respective actuated positions complete respective local circuits prepared in the master device.

Preferably, the motors are two-phase alternating current motors arranged for so-called four-wire supply. In this case, according to the invention, the control system comprises six wires to which the local switch-devices are looped, one wire of each phase being divided into two at the master switch-device so that, for each phase, one wire serves for motor circuits completed in the master device and the other wire serves for motor circuits completed in the local devices.

An example of how the invention may be carried into effect will now be described with reference to the accompanying drawings, in which—

Figure 1:
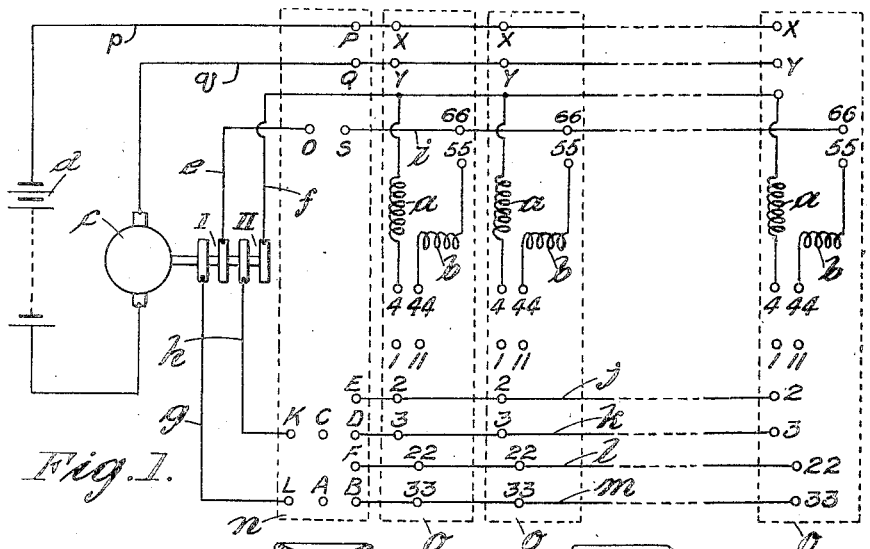

Fig. 1 is a circuit diagram.

Figure 2:
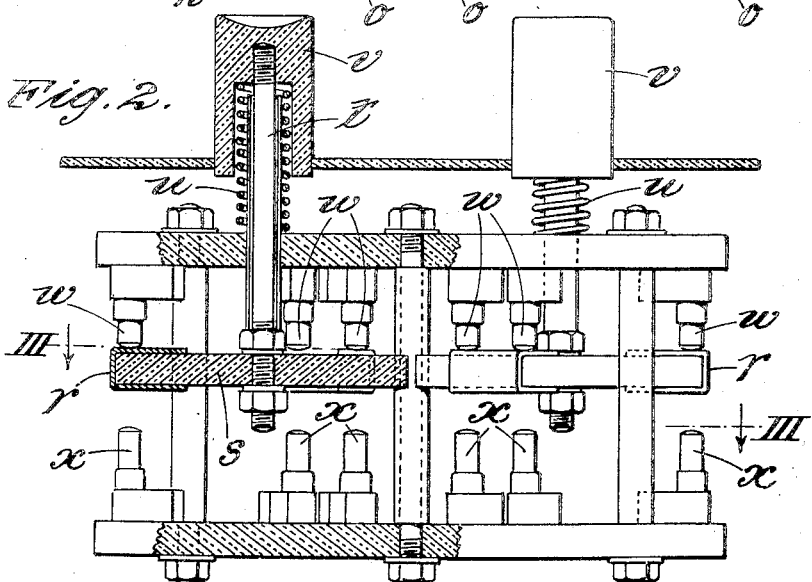

Fig. 2 a longitudinal vertical section of a switch-device, and

Figure 3:
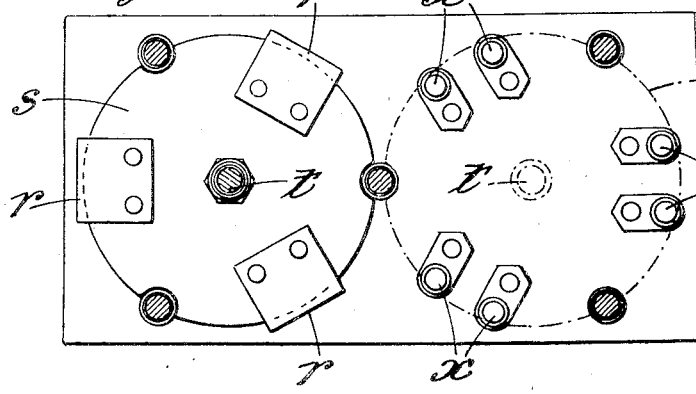

Fig. 3 a section on the line III—III in Fig. 2.

Fig. 4 is a horizontal section of a modified and preferred form of switch-device, Fig. 5 a section on the line V—V in Fig. 4, and Fig. 6 a digrammatic development, showing the disposition of the contacts in one of the switches in Fig. 4.

This example illustrates an application of the invention devised for the control of window blinds which, as described in the aforesaid application Serial Number 209,825, are each operated by an electric motor and may be enclosed within double windows of a railway vehicle.

As illustrated in Fig. 1, the phase windings $a$, $b$ of a series of simple squirrel-cage induction motors, one for each blind of a vehicle, are to be supplied with two phase alternating current by a small rotary converter $c$ which is itself to be supplied with direct current from the battery $d$ of the vehicle. The supply is taken from the two phases I, II of the converter by four wires $e$, $f$, $g$, $h$. The wire $f$ and five wires $i$, $j$, $k$, $l$ and $m$ are "through" wires, that is they extend throughout the vehicle to serve all the motors. The connection of the wires $i$—$m$ to the wires $e$, $g$, $h$ is controlled by a master switch-device $n$ located at a convenient point, such as the attendant's compartment. The connection of individual motors to the wires $i$—$m$ is further controlled by local switch-devices $o$ located near respective windows. Also extending throughout the train are wires $p$, $q$ by which the direct current supply to the converter can be established by means of contacts on each of the switch devices $n$, $o$.

It is an advantage of the invention that the master device can be of the same simple construction as each local switch-device. For these devices, which each comprise two press-button switches, i. e., an "up" switch and a "down" switch, the construction illustrated in Figs. 2 and 3 may be employed, but that illustrated in Figs. 4 and 5 is preferred. In the construction of Figs. 2 and 3, each switch comprises a set of bridging contacts $r$ carried on an insulating disc $s$ which is connected by a rod $t$ surrounded by a spring $u$ to a press-button $v$, and two sets of fixed paired contacts $w$, $x$ of the resilient-plunger type. One set of contacts $w$ is bridged by the contacts $r$ when the switch is in the normal position, in which it tends to be held by the spring $u$, and the other set of contacts $x$ is bridged when the switch is depressed. In each switch device, the switches are provided respectively with the contacts necessary for establishing motor circuits for raising and lowering the blinds, as hereinafter described.

In the construction illustrated in Figs. 4 and 5, the bridging contacts $r^1$ of each switch device are carried upon an insulating disc $s^1$ which is guided on a fixed rod $t^1$ of square section surrounded by the return spring $u^1$ and is connected to the push button $v^1$. The fixed upper and lower contacts $w^1$ and $x^1$ are carried by brackets $y^1$, $y^2$ secured inside an insulating cylinder $z$ upon the outside of which the necessary terminals $z^1$ are disposed. Where superimposed contacts $w^1$, $x^1$ are connected to a common terminal $z^1$, as on the right-hand side of Fig. 5, a double bracket $y^1$ is employed. Where superimposed contacts $w^1$, $x^1$ are connected to different terminals $z^1$, as on the left-hand side of Fig. 5, or where there is a lower contact $x^1$ but no upper contact $w^1$ single brackets $y^2$ are employed. Each of the contacts $w^1$, $x^1$ comprises jaws between which enters the end of a contact $r^1$ after the fashion of a knife switch.

The circuits to be established by the switches will now be explained by reference to Fig. 1:

In the master device, the "up" switch connects C to D and A to B when in the normal position and C to E, A to F and P to Q when depressed. The "down" switch normally connects K to C, L to A and O to S and, when depressed, K to E, L to S, O to F and P to Q. In each local device, the "up" switch normally connects 1 to 2 and 11 to 22 and, when depressed, 1 to 3, 11 to 33 and X to Y. The "down" switch normally connects 4 to 1, 55 to 66 and 11 to 44 and, when depressed, 4 to 3, 33 to 55, 44 to 66 and X to Y. Each local switch makes only local circuits, that is the circuits for its own window, except that the depression of any switch starts up the rotary converter.

By way of illustration, the arrangement of the contacts in the "down" switch of the master device is illustrated diagrammatically in Fig. 6 and the radial positions of the above described contacts in the down and up switches of the master device is also indicated in Fig. 4. The analogous arrangement of the contacts in the other switches will be readily apparent.

If the "up" button of the master switch device is pressed, the following circuits are established:
(1) Phase I, wire $g$, contacts L, A, F, wire $l$ and (in every local circuit) contacts 22, 11, 44, motor winding $b$, and contacts 55, 66, thence through wire $i$, contacts O, S, wire $e$ back to phase I. (2) Phase II, wire $h$, contacts K, C, E, wire $j$ and (in every local circuit) contacts 2, 1, 4, motor winding $a$, thence through wire $f$ back to phase II. All the motors run to raise all the blinds.

If the "down" button of the master device is pressed, the following circuits are established: (3) Phase I, wire $g$, contacts L, S, wire $i$ and (in every local circuit) contacts 66, 55, winding $b$ (current reversed as compared with circuit 1), contacts 44, 11, 22, thence through wire $l$, contacts F, O and wire $e$ back to phase I. (4) Phase II, wire $h$, contacts K, E, wire $j$ and (in every local circuit) contacts 2, 1, 4, winding $a$ (current in same direction as in circuit 1), thence through wire $f$ back to phase II. All of the motors run reversely to lower all the blinds.

The blinds can be partially raised or lowered by releasing the respective button of the master device when the blinds have reached the desired position. If both buttons of the said device are pressed accidentally, only the "down" connections are effectively made, the "up" connections being broken at LA and OS, and a short-circuit is precluded. Depression of either of the master switch buttons isolates, at CD or KC and at AB or LA, the branch wires $k$, $m$, from which local "up" or "down" connections can be made, thereby precluding short-circuits due to the depression of a local switch button simultaneously with the master switch. Depression of either master switch button causes the required operation of the blinds irrespective of their individual positions. If, say, some blinds are raised but others have been lowered or partially lowered locally, depression of the "up" button will cause raising of the lowered and partially lowered blinds. If the drive for the blinds is such that the motors stall when the blinds reach their end positions, this does not matter, since motors of the kind set forth can be easily designed to suffer no damage from such stalling.

If the "up" button of a local switch-device is pressed, the following circuits are established: (5) Phase I, wire $g$, contacts L, A, B, wire $m$ and (in the one local circuit only) contacts 33, 11, 44 and thence through winding $b$ as in circuit 1 back to phase I. (6) Phase II, wire $h$, contacts K, C, D, wire $k$ and (in the one local circuit only) contacts 3, 1, 4 and thence through winding $a$ as in circuit 2 back to phase II.

If the "down" button of a local device is pressed, the following circuits are established: (7) Phase I, wire $g$, contacts L, A, B wire $m$ and (in the one local circuit only) contacts 33, 55, winding $b$ (current in same direction as in circuit 3), contacts 44, 66, thence through wire $i$, contacts O, S, and wire $e$ back to phase I. (8) Phase II, wire $h$, contacts K, C, D, wire $k$ and (in the one local circuit only) contacts 3, 4 and thence through winding $a$ as in circuit 4 back to phase II.

By pressing the "up" or "down" button of a local device, the individual blind can thus be raised or lowered, completely or partially, as required. If a local switch button is pressed during exercise of the master control, the local blind-motor is isolated, at 2, 1 and 22, 11 or 1, 4 and 11, 44, from the wires $j$, $l$ over which the master control is exercised. This renders the master control inoperative in respect of the blind in question, so that the local or individual control of that blind cannot then be overridden. Moreover, directly the master switch button is released, the local control becomes fully effective again. Also the local control is not affected by the other local switch devices. If both buttons of a local switch are pressed, only the "down" connections are effectively made, the "up" connections being interrupted at 1, 4 and 11, 44, and short-circuit is precluded.

As will be understood, the switching operations are thus simple and substantially foolproof and the switches themselves can be of simple, robust and foolproof construction. A particular advantage of the invention is the economy achieved in the amount of wire used and in the avoidance of junction boxes, relays and so forth, which in turn enhances the ease of wiring. It will be noted that any number of blind-motors can be controlled from the same wires, in other words the number of wires is the same for any number of blinds.

For some purposes, a control system in accordance with the invention can be applied to the control of direct-current motors to be supplied, say, directly from the battery of a vehicle. In the case of shunt-wound direct-current motors, for example, the places of the windings $a$ and $b$ may be taken by the armature and field windings of the direct-current motors, the wires $g$, $h$ and the wires $e$, $f$ being connected to respective terminals of the battery.

I claim:
1. An electrical control system, particularly for electric motors driving window blinds, compris- ing, in combination with a series of motors, a master switch-device, a series of local switch-devices, and connections between the said switch-devices and motors, the master device comprising two switches which in their normal positions prepare, by way of the connections, circuits capable of being completed in any local device for causing the individual motor to run in either direction and which in their respective actuated positions complete respective circuits for causing all the motors to run in either direction, and each local device comprising two switches which in their normal positions prepare local circuits to be completed in the master device and which in their respective actuated positions complete respective local circuits prepared in the master device.

2. A control system according to claim 1, wherein the motors have each two elements to be supplied with current, the direction of rotation being reversible by reversal of the current in one only of the said elements, and there are six through wires controlled by the master and local switch-devices for supplying the motors with current, the respective switches of each device being adapted, in their actuated positions, for completing circuits for the supply of current in opposite directions for one element of the motor and in the same direction for the other element thereof.

3. A control system according to claim 1, wherein the motors are two-phase alternating-current motors arranged for "four-wire" supply and the system comprises six through wires controlled by the master and local switch-devices whose respective switches are adapted, in their actuated positions, for completing circuits for the supply of current in opposite directions to one phase winding of the motor and in the same direction to the other phase winding.

4. In combination with a series of two-phase alternating current electric motors arranged for "four-wire" supply, particularly for operating window blinds, an electrical control system for said motors comprising a master switch-device, a series of local switch-devices each associated with a respective motor, one wire of each supply phase being divided into two at the master device so that there are six wires which are extended from the said master device to the local devices and one wire of each divided phase serves for motor-energizing circuits prepared in the local devices in their normal positions and completed in the master device in its actuated position whilst the other wire of each divided phase serves for motor-energizing circuits prepared by the master device in its normal position and completed in any local device in its actuated position.

5. An electrical control system, particularly for electrically driven window blinds, comprising in combination with a series of two-phase alternating-current motors, a rotary converter for providing a supply of two-phase current, a master switch-device and a starting circuit for the said rotary converter, a series of local switch-devices and connections between the said rotary converter, the switch-devices and the motors, the master device comprising two switches which in their normal positions prepare, by way of the connections, circuits capable of being completed in any local device for causing the individual motor to run in either direction and which in their respective actuated positions complete respective circuits for causing all the motors to run in either direction, and each local device comprising two switches which in their normal positions prepare local circuits to be completed in the master device and which in their respective actuated positions complete respective local circuits prepared in the master device, each switch of each master or local switch device having contacts connected to the starting circuit for the rotary converter and adapted for completing the said circuit when the switch is actuated.

6. A control system according to claim 1, wherein, in each master or local switch-device, circuits to be completed by one switch in the actuated position are prepared through the other switch in the normal position only, so that actuation of both switches together cannot result in the simultaneous completion of the circuits ordinarily to be completed by the said switches.

7. An electrical control system, particularly for electric motors driving window blinds, comprising in combination with a series of motors, a master switch-device, a series of local switch-devices and connections between the said switch-devices and motors, the master device comprising two press-button switches which in their normal positions prepare, by way of the connections, circuits capable of being completed in any local device for causing the individual motor to run in either direction and which in their respective depressed positions complete respective circuits for causing all the motors to run in either direction, and each local device comprising two press-button switches which in their normal positions prepare local circuits to be completed in the master device and which in their respective depressed positions complete resepective local circuits prepared in the master devices.

8. A control system according to claim 7, wherein each press-button switch comprises an insulating disc connected to the press button, a plurality of bridging contacts carried by the insulating disc, pairs of upper and lower fixed contacts with which the bridging contacts co-act and an insulating cylinder inside which the said fixed contacts are supported.

9. A control system according to claim 1 wherein each switch comprises a press button, an insulating member connected to the press-button, a plurality of bridging contacts carried by the insulating member, an insulated outer casing and parts of upper and lower fixed contacts with which the bridging contacts co-act supported within said casing.

10. In combination with a plurality of electric motors, a switch arrangement for connecting the motors individually or collectively to a source of electrical energy comprising in combination a master switch device, a plurality of local switch devices each associated with a respective motor, and connections between said source, motors and switch devices, each switch device having one "off" and alternative "on" positions in each of which three positions a different combination of contacts is made by the switch device, the arrangement being such that the master switch device in its "off" position prepares motor-energizing circuits for completion in either of two ways by any local switch device in respect of its associated motor and each local switch device in its "off" position prepares motor-energizing circuits for completion in either of two ways by the master switch device in respect of all the motors, the alternative ways of completing the circuits causing the motors to move in opposite directions.

THOMAS CURZON.